(12) United States Patent
Krishnamoorthy et al.

(10) Patent No.: US 11,348,617 B1
(45) Date of Patent: May 31, 2022

(54) SYSTEM FOR IMPLEMENTING CONTENT RETROFITTING USING INFORMATION VECTORIZATION

(71) Applicant: BANK OF AMERICA CORPORATION, Charlotte, NC (US)

(72) Inventors: Madhusudhanan Krishnamoorthy, Tamilnadu (IN); Kumar Amit Dwary, New Delhi (IN); Neeraj Kumar Choudhary, Haryana (IN); Ravindran Padmanaban, Chennai (IN); Shilpi Choudhari, Telangana (IN); Nagar P. Varadarajan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/194,824

(22) Filed: Mar. 8, 2021

(51) Int. Cl.
| | |
|---|---|
| G11B 27/036 | (2006.01) |
| G06K 9/62 | (2022.01) |
| G09B 5/06 | (2006.01) |
| G06F 16/73 | (2019.01) |
| G06N 20/00 | (2019.01) |
| G09B 19/00 | (2006.01) |
| G06V 20/40 | (2022.01) |

(52) U.S. Cl.
CPC ............ *G11B 27/036* (2013.01); *G06F 16/73* (2019.01); *G06K 9/6215* (2013.01); *G06N 20/00* (2019.01); *G06V 20/46* (2022.01); *G06V 20/48* (2022.01); *G09B 5/065* (2013.01); *G09B 19/003* (2013.01)

(58) Field of Classification Search
CPC ....... G11B 27/036; G06N 20/00; G06F 16/73; G06V 20/46; G06V 20/48; G06K 9/6215; G09B 5/065; G09B 19/003
See application file for complete search history.

(56) References Cited

U.S. PATENT DOCUMENTS

| | | | |
|---|---|---|---|
| 6,119,112 | A | 9/2000 | Bush |
| 6,192,360 | B1 | 2/2001 | Dumais et al. |
| 7,529,748 | B2 | 5/2009 | Wen et al. |
| 7,933,031 | B2 | 4/2011 | Aritomi |
| 7,961,175 | B2 | 6/2011 | Lapstun et al. |
| 8,010,466 | B2 | 8/2011 | Patinkin |
| 8,041,952 | B2 | 10/2011 | Parry |
| 8,127,149 | B1 | 2/2012 | Nachenberg |
| 8,245,306 | B2 | 8/2012 | Gimenez |

(Continued)

*Primary Examiner* — Mishawn N. Hunter
(74) *Attorney, Agent, or Firm* — Moore & Van Allen PLLC; Anupshrinivasan Iyer

(57) ABSTRACT

Systems, computer program products, and methods are described herein implementing content retrofitting using information vectorization. The present invention is configured to retrieve a user interaction portfolio of a user associated with a completion of a first task; determine requirements associated with the first task; determine an interaction score associated with the user; determine a target interaction score associated with the first task; determine that the interaction score associated with the user is greater than the target interaction score associated with the first task; generate one or more second image frames based on at least the one of the one or more user interactions that did not meet the one or more interaction requirements; generate at least one modified video file based on at least the one or more second image frames; and store the at least one modified video file in a knowledge repository.

20 Claims, 6 Drawing Sheets

(56) References Cited

U.S. PATENT DOCUMENTS

| | | |
|---|---|---|
| 8,305,604 B2 | 11/2012 | McIntyre |
| 8,572,758 B1 | 10/2013 | Clifford |
| 8,799,287 B1 | 8/2014 | Barile et al. |
| 2002/0042884 A1 | 4/2002 | Wu et al. |
| 2005/0166052 A1 | 7/2005 | Khormaei et al. |
| 2007/0031046 A1 | 2/2007 | Onishi |
| 2009/0067729 A1 | 3/2009 | Turkelson et al. |
| 2011/0093768 A1 | 4/2011 | Panwar |
| 2011/0239113 A1 | 9/2011 | Hung et al. |
| 2012/0101870 A1 | 4/2012 | Gates et al. |
| 2012/0206758 A1 | 8/2012 | Gibson et al. |
| 2013/0007097 A1 | 1/2013 | Sambe et al. |
| 2017/0161275 A1* | 6/2017 | Speer ................. G06F 16/24522 |
| 2018/0091654 A1* | 3/2018 | Miller ....................... G06N 5/04 |
| 2019/0347585 A1* | 11/2019 | Mowatt ................... H04L 67/22 |
| 2021/0241289 A1* | 8/2021 | Roy ......................... H04L 67/22 |
| 2022/0043984 A1* | 2/2022 | Miranda .............. G06Q 20/108 |

* cited by examiner

SYSTEM FOR IMPLEMENTING CONTENT RETROFITTING USING INFORMATION VECTORIZATION

FIELD OF THE INVENTION

The present invention embraces a system for implementing content retrofitting using information vectorization.

BACKGROUND

Executing tasks often requires users (e.g., employees) to implement a specific set of operations (e.g., user interactions—on-screen actions) in a predetermined manner/sequence. Typically, users receive training via video module discussing what these operations are and how they are to be implemented to execute tasks. It is not uncommon for users to implement operations that deviate from what is required of them. However, there are instances where even though the users implement operations that deviate from what is required of them, their deviations increase productivity.

Therefore, there is a need for a system that implements content retrofitting using information vectorization by incorporating the outliers into existing requirements.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing content retrofitting using information vectorization is presented. The system comprising: at least one non-transitory storage device; and at least one processing device coupled to the at least one non-transitory storage device, wherein the at least one processing device is configured to: electronically retrieve a user interaction portfolio of a user, wherein the user interaction portfolio comprises one or more user interactions associated with a completion of a first task; determine one or more interaction requirements associated with the first task; determine that at least one of the one or more user interactions do not meet the one or more interaction requirements associated with the first task; determine an interaction score associated with the user based on at least determining that at least one of the one or more user interactions do not meet the one or more interaction requirements associated with the first task; determine a target interaction score associated with the first task based on at least the one or more interaction requirements; determine that the interaction score associated with the user is greater than the target interaction score associated with the first task; generate one or more second image frames based on at least the one of the one or more user interactions that did not meet the one or more interaction requirements and that the interactions score is greater than the target interaction score; generate at least one modified video file based on at least the one or more second image frames; and store the at least one modified video file in a knowledge repository.

In some embodiments, the at least one processing device is further configured to determine the user interaction portfolio of the user, wherein determining further comprises: initiate an activity monitoring engine on a computing device of the user; continuously monitor, using the activity monitoring engine, the one or more user interactions with one or more applications used by the user to complete the first task; and generate the user interaction portfolio based on at least the one or more user interactions with the one or more applications used by the user to complete the first task.

In some embodiments, the one or more user interactions comprises at least one or more one-screen actions executed by the user using the one or more applications to complete the first task, wherein the one or more on-screen actions comprises at least windows opened, system commands executed, checkboxes clicked, and/or text entered/edited.

In some embodiments, the at least one processing device is further configured to: determine the one or more interaction requirements associated with the first task, wherein the one or more interaction requirements comprises one or more predetermined actions to be executed by the user using the one or more applications to complete the first task.

In some embodiments, the at least one processing device is further configured to: retrieve, from the knowledge repository, one or more video files demonstrating one or more interaction requirements associated with one or more tasks, wherein each of the one or more video files comprises one or more image frames; initiate a feature extraction algorithm on the one or more image frames associated with each of the one or more video files; and extract, using the feature extraction algorithm, one or more features associated with the one or more image frames for each of the one or more video files.

In some embodiments, the at least one processing device is further configured to: initiate a vectorization engine on the one or more features associated with the one or more image frames for each of the one or more video files; and map, using the vectorization engine, the one or more features into one or more sets of vectors of real numbers in a vector-space.

In some embodiments, the at least one processing device is further configured to: initiate the feature extraction algorithm on the one or more second image frames; and extract, using the feature extraction algorithm, one or more second features associated with the one or more second image frames.

In some embodiments, the at least one processing device is further configured to: initiate the vectorization engine on the one second image frames; and map, using the vectorization engine, one or more second features into a second set of vectors of real numbers in the vector-space.

In some embodiments, the at least one processing device is further configured to: determine a similarity index between the second set of vectors associated with the one or more second image frames and each of the one or more sets of vectors associated with the one or more image frames; determine at least one set of vectors from the one or more sets of vectors having a similarity index that is greater than a predetermined similarity index; and determine that the at least one set of vectors is associated with at least one video file.

In some embodiments, the at least one processing device is further configured to: retrieve one or more image frames associated with the at least one video file; and interleave the one or more second image frames with the one or more image frames associated with the at least one video file; and generate at least one modified video file based on at least interleaving the one or more second image frames with one or more image frames associated with the at least video file.

In some embodiments, the at least one processing device is further configured to: determine that the interaction score associated with the user is less than the target interaction score; and electronically receive, from a knowledge repository, a first video file demonstrating the one or more interaction requirements.

In some embodiments, the at least one processing device is further configured to: electronically receive, from the knowledge repository, a first video file demonstrating the one or more interaction requirements associated with the first task; initiate a reinforcement learning algorithm on the first video file, wherein the first video file comprises one or more first image frames; determine, using the reinforcement learning algorithm, a first portion of the one or more first image frames from the one or more first image frames associated with the first video file, wherein the first portion of the one or more first image frames is determined based on at least the one of the one or more user interactions that did not meet the one or more interaction requirements associated with the first task; and generate the modified first video file based on at least the first portion of the one or more first image frames from the one or more first image frames associated with the first video file.

In another aspect, a computer program product for implementing content retrofitting using information vectorization is presented. The computer program product comprising a non-transitory computer-readable medium comprising code causing a first apparatus to: electronically retrieve a user interaction portfolio of a user, wherein the user interaction portfolio comprises one or more user interactions associated with a completion of a first task; determine one or more interaction requirements associated with the first task; determine that at least one of the one or more user interactions do not meet the one or more interaction requirements associated with the first task; determine an interaction score associated with the user based on at least determining that at least one of the one or more user interactions do not meet the one or more interaction requirements associated with the first task; determine a target interaction score associated with the first task based on at least the one or more interaction requirements; determine that the interaction score associated with the user is greater than the target interaction score associated with the first task; generate one or more second image frames based on at least the one of the one or more user interactions that did not meet the one or more interaction requirements and that the interactions score is greater than the target interaction score; generate at least one modified video file based on at least the one or more second image frames; and store the at least one modified video file in a knowledge repository.

In yet another aspect, a method for implementing content retrofitting using information vectorization is presented. The method comprising: electronically retrieving a user interaction portfolio of a user, wherein the user interaction portfolio comprises one or more user interactions associated with a completion of a first task; determining one or more interaction requirements associated with the first task; determining that at least one of the one or more user interactions do not meet the one or more interaction requirements associated with the first task; determining an interaction score associated with the user based on at least determining that at least one of the one or more user interactions do not meet the one or more interaction requirements associated with the first task; determining a target interaction score associated with the first task based on at least the one or more interaction requirements; determining that the interaction score associated with the user is greater than the target interaction score associated with the first task; generating one or more second image frames based on at least the one of the one or more user interactions that did not meet the one or more interaction requirements and that the interactions score is greater than the target interaction score; generating at least one modified video file based on at least the one or more second image frames; and storing the at least one modified video file in a knowledge repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
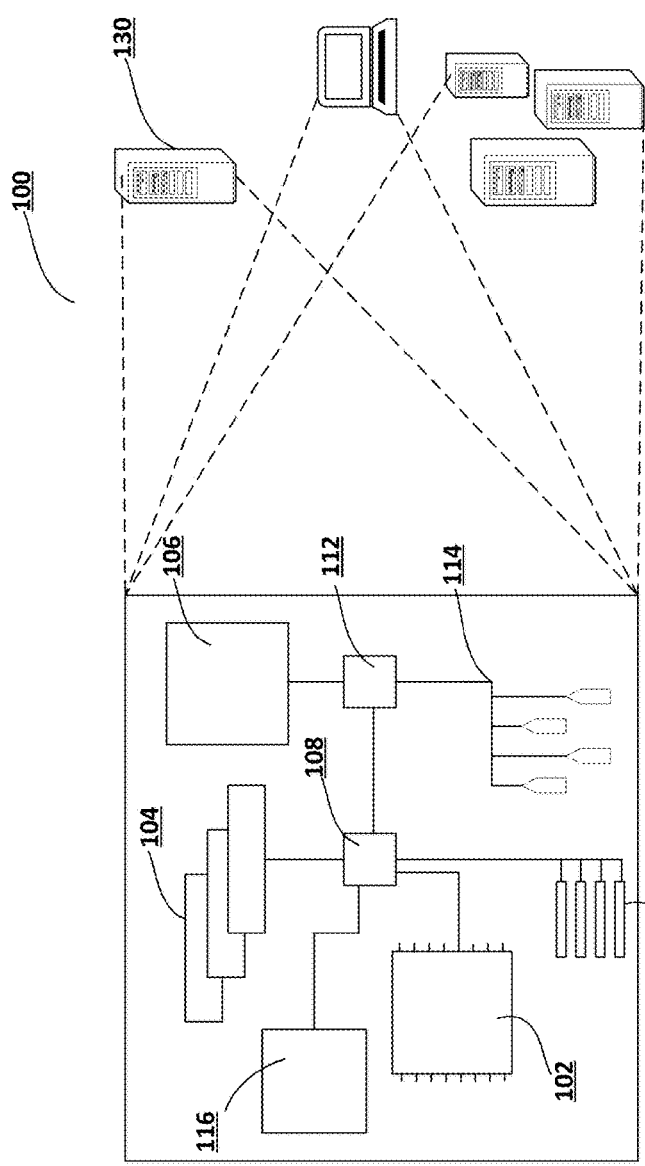
Figure 1:
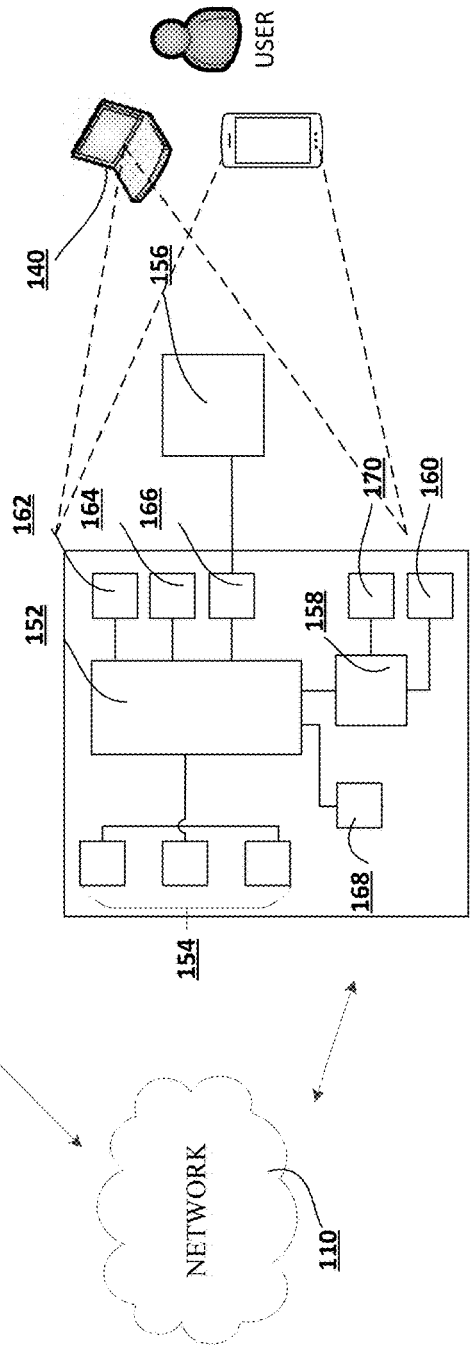
Figure 2:
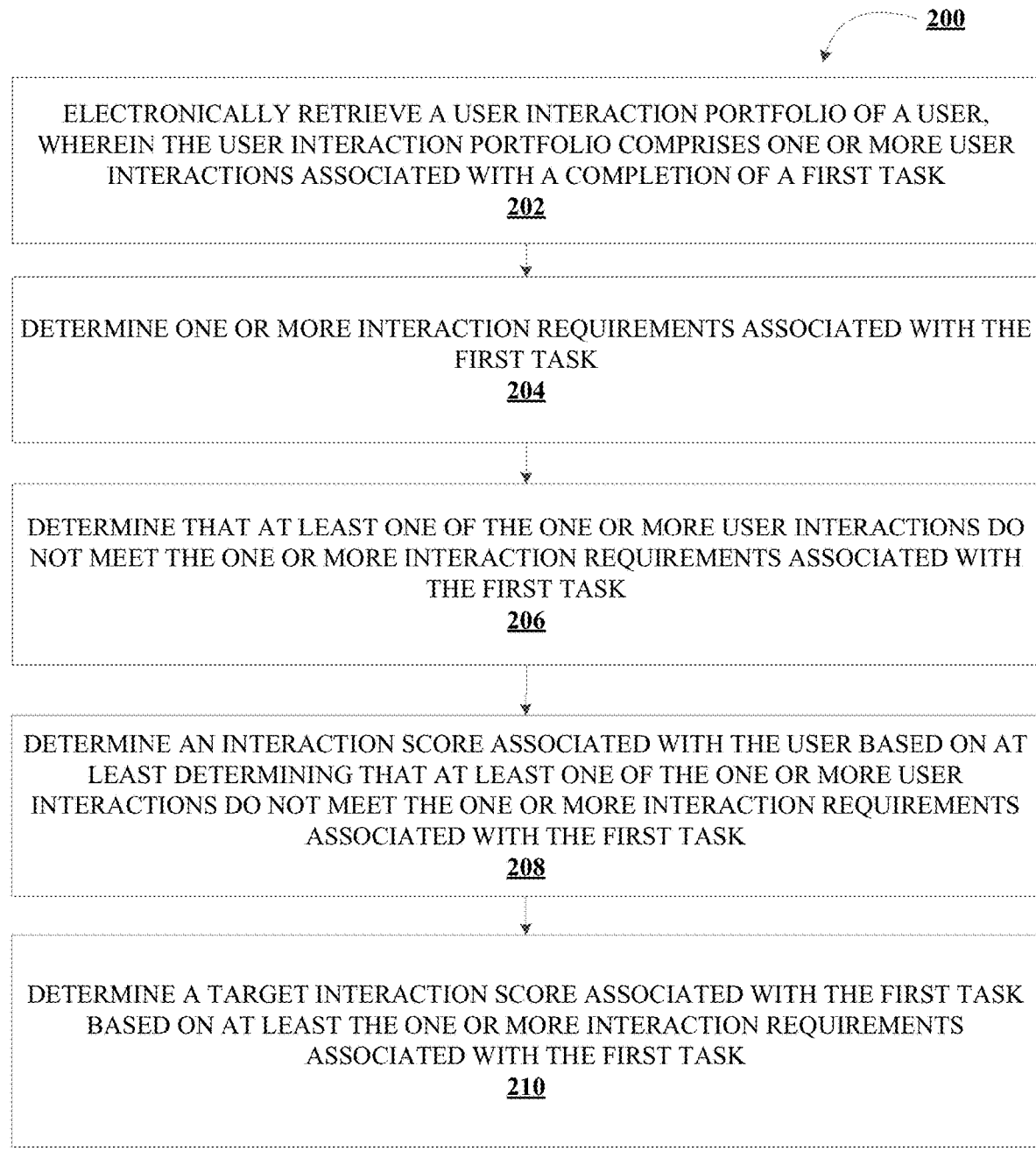
Figure 3:
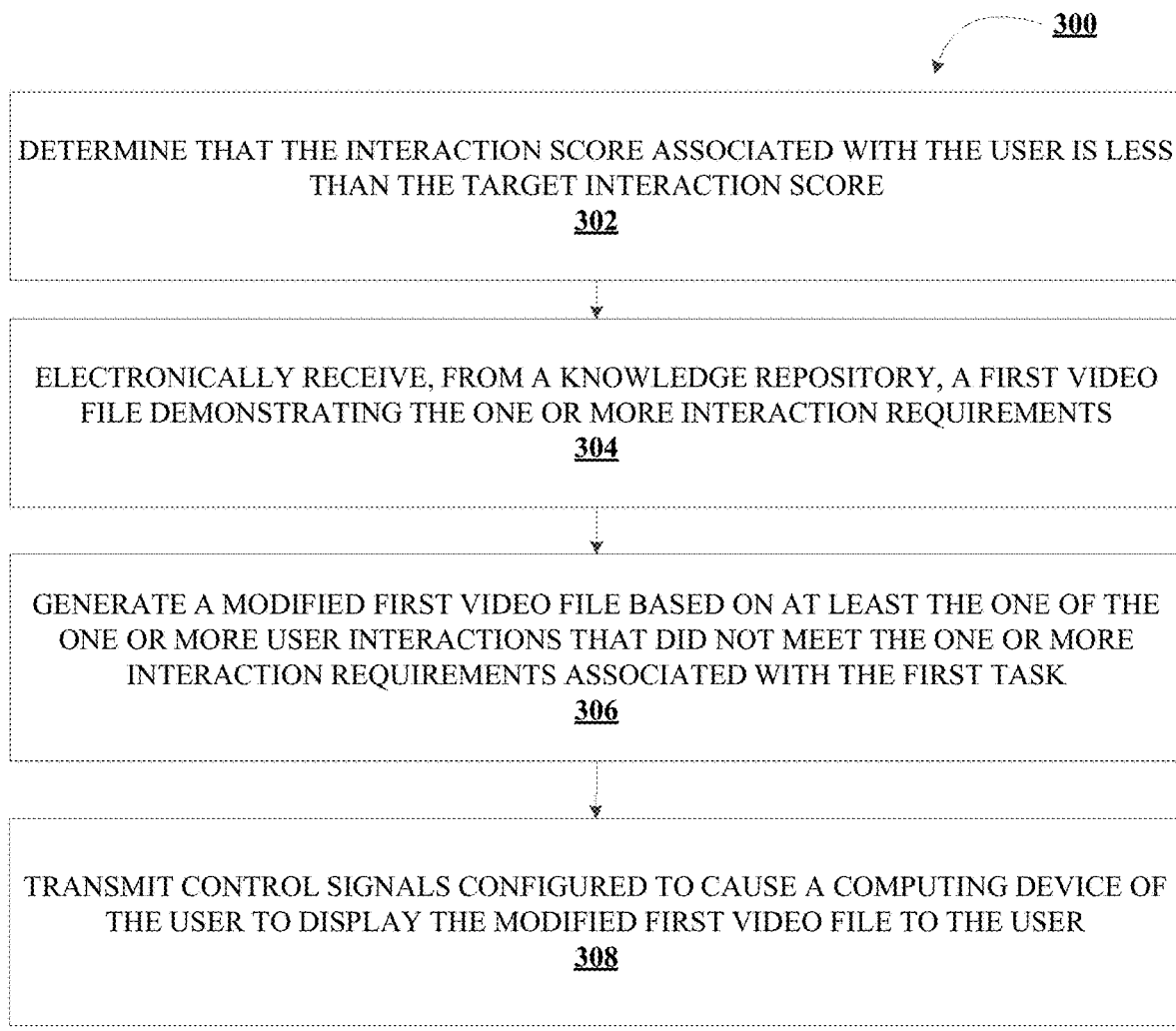
Figure 4:
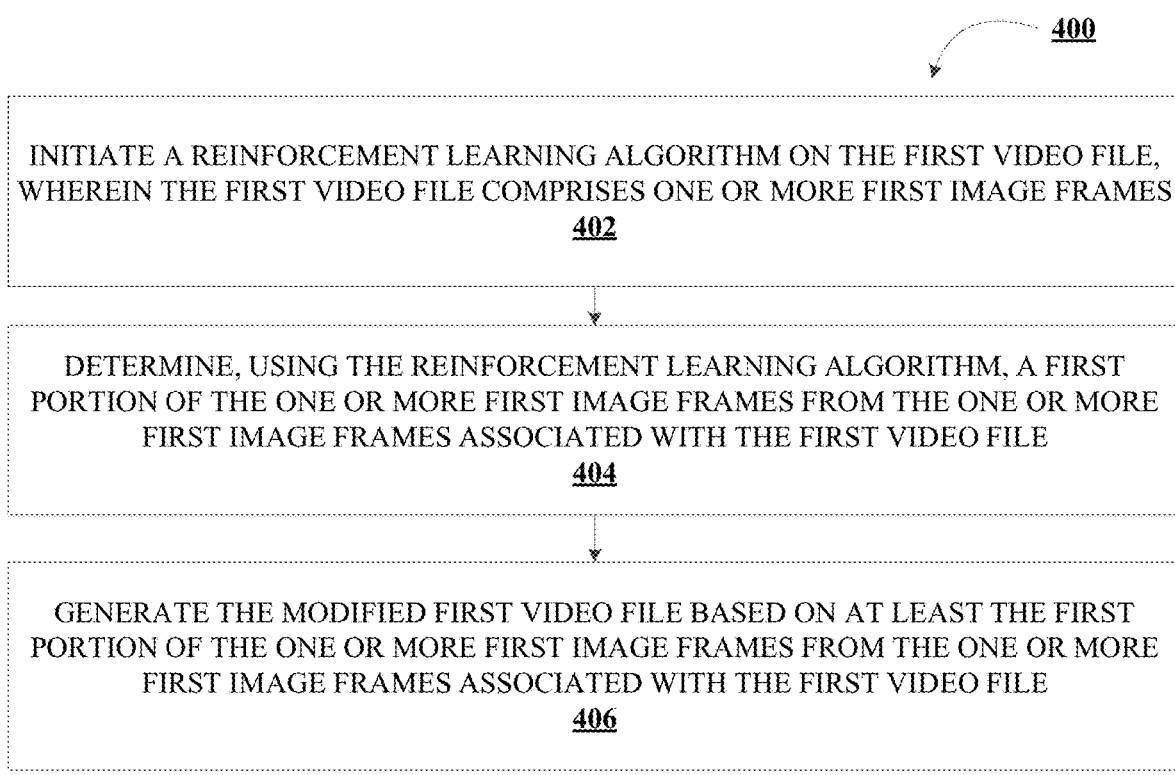
Figure 5:
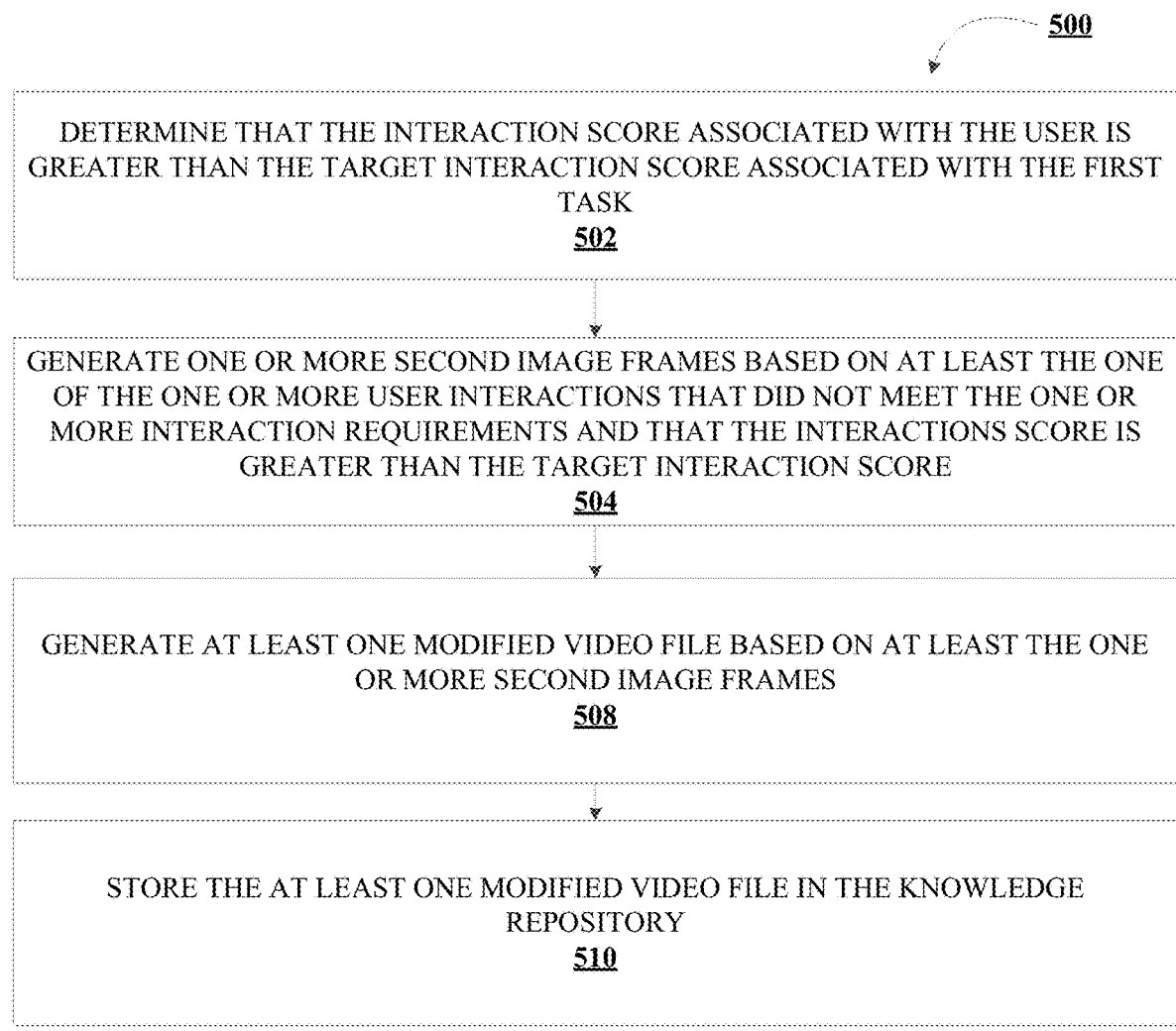
Figure 6:
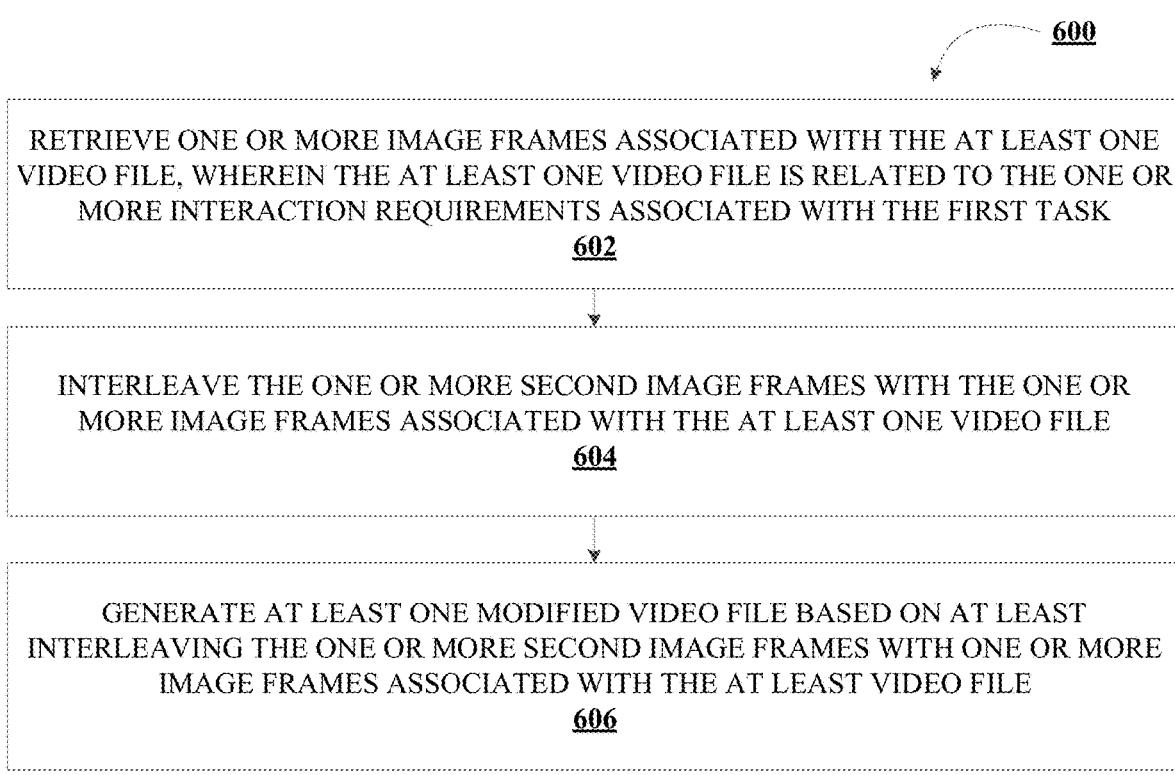

Having thus described embodiments of the invention in general terms, reference will now be made the accompanying drawings, wherein:

FIG. 1 illustrates technical components of a system for implementing auto didactic content generation using reinforcement learning, in accordance with an embodiment of the invention;

FIG. 2 illustrates a process flow for determining an interaction score associated with the user interaction portfolio, in accordance with an embodiment of the invention;

FIG. 3 illustrates a process flow for initiating auto didactic content generation, in accordance with an embodiment of the invention;

FIG. 4 illustrates a process flow for implementing a reinforcement learning for content generation, in accordance with an embodiment of the invention;

FIG. 5 illustrates a process flow for initiating content retrofitting process, in accordance with an embodiment of the invention; and FIG. 6 illustrates a process flow for content generation by interleaving image frames, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

FIG. 1 presents an exemplary block diagram of the system environment for implementing auto didactic content generation using reinforcement learning 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Processing transactions in areas such as Global Trade Operations requires users (e.g., employees) to implement a specific set of operations (e.g., user interactions—on-screen actions) in a predetermined manner/sequence. Typically, users receive training via video module discussing what these operations are and how they are to be implemented to process transactions. However, is not uncommon for users to implement operations that deviate from what is required of them, resulting in decreased productivity (deviations). On the other hand, there are instances where even though the users implement operations that deviate from what is required of them, their deviations increase productivity (outliers). Therefore, there is a need for a system that, (i) generates individualized training video modules based on deviations to re-train the user of what is required of them, and (ii) generate domain-level training video modules by incorporating the outliers into existing requirements.

FIG. 2 illustrates a process flow for determining an interaction score associated with the user interaction portfolio 200, in accordance with an embodiment of the invention. As shown in block 202, the process flow includes electronically retrieving a user interaction portfolio of a user, wherein the user interaction portfolio comprises one or more user interactions associated with a completion of a first task. In some embodiments, the user interactions may include specific actions executed by the user with the computing resources (e.g., devices, networks, and/or the like) of the entity. In one aspect, the user interactions may include on-screen actions (actions) executed by the user to complete a first task. Examples of on-screen actions include, but are not limited to windows opened, system commands executed, checkboxes clicked, text entered/edited, and/or the like.

To capture the user interactions, the system may be configured to initiate an activity monitoring engine on the computing device of the user. In some embodiments, the activity monitoring engine may be configured to capture a precise view of the activity of users of applications and visitors to websites, down to each effective action taken. In this regard, the system may be configured to continuously monitor, using the activity monitoring engine, the user interactions. In one aspect, the activity monitoring engine may be configured to monitor a number of applications used by the user and capture specific actions executed by the user in each of the applications.

In some embodiments, the system may be configured to initiate the activity monitoring engine each time the user begins a new task. In this regard, the system may be configured to receive, from a computing device (e.g., user input system 140), an indication that the user has initiated a new task, e.g., the first task. In one aspect, a task may refer to any activity, objective, process, light-weight process, thread (for execution), step, request, query, unit of work, and/or the like, that needs to be completed within predetermined parameters. To complete each task, the user may be required to access specific applications, data objects, computing resources, databases, and/or the like. In some embodiments, the system may be configured to receive, from the computing device of the user, an indication that the user has initiated a new task. In response to receiving the indication, the system may be configured to initiate the activity monitoring engine to capture user interactions. Once the user has completed the task, the activity monitoring engine may automatically be terminated. In this regard, the system may be configured to receive, from the computing device of the user, an indication that the user has completed the task. For example, the completion of a task may require the user to move the processed data object into a target database. If the system detects that the user has moved the processed data object into the target database, it may automatically trigger the termination of the activity monitoring engine. Once terminated, the system may be configured to generate the user interaction portfolio based on at least the one or more user interactions with the one or more applications used by the user to complete the first task.

Next, as shown in block 204, the process flow includes determining one or more interaction requirements associated with the first task. In some embodiments, each task may be completed in a number of different ways by executing a number of different actions. However, each task may be associated with interaction requirements that define specific metrics for each action executed by the user. These interaction requirements are determined based on maximizing an efficiency with which each task is executed and minimizing an amount of time required to complete a task. In one aspect, the interaction requirements may define a predetermined number of actions, predetermined type of actions, and/or a predetermined sequence of actions to be executed by the user to complete a task. Each task may be associated with interaction requirements that are specific to that task. In one aspect, each task type may be associated with a common set of interaction requirements.

Next, as shown in block 206, the process flow includes determining that at least one of the one or more user interactions do not meet the one or more interaction requirements associated with the first task. In this regard, the system may be configured to compare each user interaction with each interaction requirement in real-time, as the user is working on completing the first task. In another aspect, the system may be configured to capture all the user interactions of the user, and once the user has completed the first task, compares the captured interactions with the interaction requirements of the first task.

Based on this comparison, the system may be configured to determine that some of the user interactions did not meet the interaction requirements associated of the first task. In one aspect, when comparing the user interactions with the interaction requirements, the system may be configured to compare individual user actions with predetermined type of actions required to complete the first task. In another aspect, when comparing the user interactions with the interaction requirements, the system may be configured to compare a number of actions executed by the user to complete the first task with the predetermined number of actions required to complete the first task. In yet another aspect, the system may be configured to compare a consecutive number of user actions to a consecutive number of predetermined actions to determine whether the user interactions follow the predetermined sequence of actions required to complete the first task.

Next, as shown in block 208, the process flow includes determining an interaction score associated with the user based on at least determining that at least one of the one or more user interactions do not meet the one or more interaction requirements associated with the first task. In some embodiments, the system may be configured to determine the interaction score based on at least one or more factors associated with the user interactions. In one aspect, the one or more factors may include, but are not limited to, a total amount of time taken to complete the first task, total number of applications initiated by the user, number of applications initiated and used by the user to complete the first task, number of applications initiated but unused by the user, an authorization level associated with each application initiated by the user, a number of unsuccessful attempts to use the application, a total amount of computing resources used to execute the first task, a number of external network devices invoked to complete the first task, and/or the like. Each factor may be assigned a predetermined weight and a score. Based on the weight and score assigned to each factor, the system may be configured to determine the interaction score of the user.

Next, as shown in block 210, the process flow includes determining a target interaction score associated with the first task based on at least the one or more interaction requirements. In some embodiments, based on same or similar factors used to calculate the interaction score of the user, the system may be configured to determine the target interaction score for the first task. The target interaction score may be used as a benchmark for each user when analyzing how well the user has completed a particular task. If the interaction score of the user is greater than the target interaction score, it is an indication that the user has completed the task in a manner more efficient than what is prescribed for that task. On the other hand, if the interaction score of the user is less than the target interaction score, it is an indication that the user has completed the task in a manner that is less efficient than what is prescribed for that task. In some embodiments, the system may be configured to establish a predetermined threshold for the interaction score to determine whether external actions need to be taken to address the efficiency of the user in completing same or similar tasks in the future.

As described herein, the system of the present invention captures every user interaction (e.g., on-screen action) executed by the user for a predetermined period of time. These user interactions are then compared to a specific set of interaction requirements the user is expected (required) to execute to complete a task (e.g., process a transaction). By comparing the user interactions to the interaction requirements, the system identifies deviations. Deviations are user interactions that do not match the interaction requirements, that reduce productivity. Once the deviations are identified, the system uses reinforcement learning to identify specific video frames from domain-level video modules that are specific to the deviations. Once identified, these frames are stitched together to form an individualized training video module informing the user of how to avoid these deviations and demonstrating the execution of the (expected) interaction requirements.

FIG. 3 illustrates a process flow for initiating auto didactic content generation 300, in accordance with an embodiment of the invention. As shown in block 302, the process flow includes determining that the interaction score associated with the user is less than the target interaction score. As described herein, if the interaction score of the user is less than the target interaction score, it is an indication that the user has completed the first task in a manner that is less efficient than what is prescribed for that first task (deviations). In some embodiments, the system may be configured to establish a predetermined threshold that is less than the target interaction score. If the interaction score of the user falls between the predetermined threshold and the target interaction score, no action is taken as it is an indication that the user has completed the task with an efficiency that is within the prescribed tolerance. However, if the interaction score of the user is less than the predetermined threshold, the system may be configured to trigger responsive actions (as described below).

Next, as shown in block 304, the process flow includes electronically receiving, from a knowledge repository, a first video file demonstrating the one or more interaction requirements associated with the first task. Typically, a video file is an electronic medium for the recording, copying, playback, broadcasting, and display of moving visual media. In this regard, the video file may be a collection of image frames configured to transition on a timeline. In some embodiments, the video file may be associated with an educational and/or informational platform that may demonstrate the interaction requirements associated with a task. Here, the first video file demonstrates the interaction requirements associated with the first task.

Next, as shown in block 306, the process flow includes generating a modified first video file based on at least the one of the one or more user interactions that did not meet the one or more interaction requirements associated with the first task. By comparing the user interactions with the interaction requirements, the system may be configured to determine specific interaction requirements that were not met by the user when completing the first task. In response, the system may be configured to initiate a context analysis algorithm on the interaction requirements that were not met by the user. In some embodiments, the context-analysis algorithm may be configured to implement systematic analysis—identification, sorting, organization, interpretation, consolidation, and communication—of the interaction requirements in contextual inquiry. This is done for the purpose of understanding a context associated with specific image frames from the first video file that pertain to the interaction requirements that were not met by the user. For example, the user may have deviated from the interaction requirement to execute a specific action to accomplish a sub-task associated with the first task. By extracting context information from the interaction requirements that were not followed by the user, the system may be configured to identify a broader context associated with the interaction requirements.

In response to identifying the specific image frames, the system may be configured to automatically generate the modified first video file that demonstrates the specific interaction requirements that were not met by the user. In some embodiments, the system may be configured to implement reinforcement learning to segment the specific image frames from the first video file automatically. In one aspect, the system may be configured to use the broader context as at least one of the inputs to generate the modified video file to demonstrate interaction requirements that were not met by the user. In embodiments contemplated herein, the system may be configured to implement upside down reinforcement learning to segment the first video file to generate the modified first video file.

Next, as shown in block 308, the process flow includes transmitting control signals configured to cause a computing device of the user to display the modified first video file to the user.

FIG. 4 illustrates a process flow for implementing a reinforcement learning for content generation 400, in accordance with an embodiment of the invention. As shown in block 402, the process flow includes initiating a reinforcement learning algorithm on the first video file, wherein the first video file comprises one or more first image frames. Reinforcement learning algorithm may be associated with a class of algorithms for solving problems modeled as a Markov Decision Process (MDP), a discrete time stochastic control process that provide a modeling decision making in situations where outcomes are partly random and partly under the control of a decision maker. In this regard, the reinforcement learning algorithm may be composed of an agent (e.g., an autonomous entity which acts, directing its activity towards achieving goals), a set of states, and a set of actions per state (e.g., modifying the video file), and an environment (e.g., interactive application environment). Executing an action in a specific state provides the agent with a cost/reward (a numerical score). The goal of the agent is to maximize its total (future) reward. This is achieved by adding the maximum reward attainable from future states to the reward for achieving its current state, effectively influencing the current action by the potential future reward. This potential reward is a weighted sum of the expected values of the rewards of all future steps starting from the current state. However, one challenge characteristic of deep reinforcement learning is that it requires a large amount of data for models to exhibit the desired behavior.

To overcome the need for large amount of data, embodiments of the invention uses an upside down reinforcement learning (UDRL) algorithm on the image frames of the first video file. Instead of predicting rewards as in traditional reinforcement learning, the rewards are used as input to an agent in the UDRL in the form of a desired return/desired horizon couple along with the observations and broader context to produce the output actions.

Next, as shown in block 404, the process flow includes determining, using the reinforcement learning algorithm, a first portion of the one or more first image frames from the one or more first image frames associated with the first video file. In some embodiments, the first portion of the one or more first image frames may be determined based on at least the one of the one or more user interactions that did not meet the one or more interaction requirements associated with the first task. In some embodiments, the observations may be the image frames of the first video file; the desired return may include a condition that requires the agent to identify specific image frames from the first video file that are related to the interaction requirements that were not met by the user by providing contextual information extracted from the interaction requirements previously; and the desired return/desired horizon couple may include a specific number of time steps within which the agent is expected to identify the specific image frames. Based on the observations and the desired return/desired horizon couple, the agent may be able to identify a first portion of the one or more first image frames from the one or more first image frames associated with the video file. The first portion of the one or more first image frames constitute image frames that demonstrate the interaction requirements that were not met by the user when completing the first task.

Next, as shown in block 406, the process flow includes generating the modified first video file based on at least the first portion of the one or more first image frames from the one or more first image frames associated with the first video file.

In some embodiments, the present invention compares the captured user interactions to the interaction requirements to identify outliers. Outliers are user interactions executed by the user to complete a task (e.g., process a transaction) that do not match the interaction requirements associated with that task, that increase productivity. Once these outliers are identified, they are approved by subject matter experts (SMEs) and then incorporated into the interaction requirements going forward. This is achieved by vectorizing the outliers and the interaction requirements demonstrated by video modules in each domain and determining the outliers' best applicability in operations by implementing a distance based similar index in a multidimensional vector space. Once their applicability is determined, the system then generates video frames specific to the outliers and incorporates the video frames in the domain-level video modules of each applicable domain.

FIG. 5 illustrates a process flow for initiating content retrofitting process 500, in accordance with an embodiment of the invention. As shown in block 502, the process flow includes determining that the interaction score associated with the user is greater than the target interaction score associated with the first task (outliers). As described herein, if the interaction score of the user is greater than the target interaction score, it is an indication that the user has completed the first task in a manner that is more efficient than what is prescribed for that first task (outliers).

Next, as shown in block 504, the process flow includes generating one or more second image frames based on at least the one of the one or more user interactions that did not meet the one or more interaction requirements and that the interactions score is greater than the target interaction score. In some embodiments, the system may be configured to isolate specific user interactions (e.g., on-screen actions) that did not meet the interaction requirements associated with the first task. Once isolated, the system may be configured to transform the specific user interactions into a sequence of image frames (one or more second image frames). This sequence of image frames is used to demonstrate the specific user interactions that increased productivity. In some other embodiments, the system may be configured to transmit the specific user interactions to one or more subject matter experts. These subject matter experts will in-turn generate a sequence of image frames (one or more second image frames) that demonstrate the specific user interactions performed by the user that increased productivity.

In some embodiments, the system may be configured to retrieve, from a knowledge repository, one or more video files demonstrating one or more interaction requirements associated with one or more tasks, wherein each of the one or more video files comprises one or more image frames. As described herein, each video file may include educational information demonstrating interaction requirements for a particular task. In some cases, two or more tasks may have overlapping interaction requirements, i.e., two or more tasks may require a specific set of actions to be executed in same or different contexts to complete a portion of that task. In such cases, two or more video files may include a demonstration of same or similar interaction requirements as part of their respective tasks. Therefore, when generating image frames that demonstrate specific user interactions performed by the user that increased productivity when executing the first task, the system must identify other tasks (demonstrated by other video files) in which such specific user interactions may be applicable, and likely increase productivity.

To identify video files with interaction requirements that may benefit from the specific user interactions performed by the user that increased productivity, the system may be configured to initiate a feature extraction algorithm on the one or more image frames associated with each of the one or more video files. Feature extraction is a part of the dimensionality reduction process, in which, an initial set of the raw data (one or more second frames) is divided and reduced to more manageable groups. Before getting features, various image preprocessing techniques like binarization, thresholding, resizing, normalization, and/or the like are applied on the one or more image frames. After that, feature extraction techniques are applied to identify features that will be useful in classification and recognition of images.

In some embodiments, the feature extraction algorithm may include convolutional neural networks (CNN). CNNs are used widely in image processing due to its success in image classification and other applications in the computer vision fields, such as object detection, face recognition, and pedestrian detection. The efficient training implementation on modern powerful graphics processing unit (GPU) and the use of Rectified Linear Unit (ReLU) which makes convergence much faster while presenting good quality are some of the advantages of using CNN to extract visual features from image frames. In response, the system may be configured to extract, using the feature extraction algorithm, one or more features associated with the one or more image frames for each of the one or more video files. In some embodiments, each feature may be a piece of information about the content of an image frame; typically, about whether a certain region of the image frame has certain properties. In one aspect, each feature may represent specific structures in the image such as points, edges, or objects. In another aspect, each feature may be related to motion in image frames, or to shapes defined in terms of curves or boundaries between different image regions.

Next, the system may be configured to initiate a vectorization engine on the one or more features associated with the one or more image frames for each of the one or more video files. In response, the system may be configured to map, using the vectorization engine, the one or more features into one or more sets of vectors of real numbers in a vector-space. Each set of vectors is conceptually the representation of a feature extracted from an image frame.

In some embodiments, the system may be configured to initiate the feature extraction algorithm (same or similar feature extraction algorithms implemented on the one or more image frames) on the one or more second image frames. In response, the system may be configured to extract, using the feature extraction algorithm, one or more second features associated with the one or more second image frames. Next, the system may be configured to initiate the vectorization engine on the one second image frames. In response, the system may be configured to map, using the vectorization engine, one or more second features into a second set of vectors of real numbers in the vector-space.

Having mapped the one or more features and the one or more second features in a vector-space, the system may be configured to determine a similarity index between the second set of vectors associated with the one or more second image frames and each of the one or more sets of vectors associated with the one or more image frames. In some embodiments, the similarity index to identify the distance between two clusters of vectors in a vector space may be a distance analysis. In one aspect, the distance analysis may be based on one or more distance measures, such as, Euclidean distance, Manhattan distance, Pearson Correlation distance, cosine distance, Spearman correlation distance, and/or the like.

In response, the system may be configured to determine at least one set of vectors from the one or more sets of vectors having a similarity index that is greater than a predetermined similarity index. In one aspect, the predetermined similarity index may be a threshold distance measure. A lower threshold distance indicates that the features are closer to each other and are thus have a higher similarity index. On the other hand, a higher threshold distance indicates that the features are farther away from each other and thus have a lower similarity index.

In response to determining the at least one set of vectors from the one or more sets of vectors the system may be configured to determine that the at least one set of vectors is associated with at least one video file. By determining that at least one set of vectors from the one or more sets of vectors (features extracted from image frames associated with the one or more video files) have a high similarity index with the one or more second set of vectors (features extracted from the one or more second image frames), the system may be configured to identify the at least one video file in which the one or more second image frames need to be incorporated.

Next, as shown in block 506, the process flow includes generating at least one modified video file based on at least the one or more second image frames. In some embodiments, the system may be configured to generate the at least one modified video file by interleaving the image frames related to the specific user interactions that increased productivity (one or more second image frames) with the image frames of applicable video files (the at least one video file). Next, as shown in block 508, the process flow includes storing the at least one modified video file in the knowledge repository.

FIG. 6 illustrates a process flow for content generation by interleaving image frames 600, in accordance with an embodiment of the invention. As shown in block 602, the process flow includes retrieving one or more image frames associated with the at least one video file. Next, as shown in block 604, the process flow includes interleaving the one or more second image frames with the one or more image frames associated with the at least one video file. In this regard, the system may be configured to insert the one or more second image frames into applicable positions on the timeline of the at least one video. Next, as shown in block 606, the process flow includes generating at least one modified video file based on at least interleaving the one or more second image frames with one or more image frames associated with the at least video file.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing content retrofitting using information vectorization, the system comprising:
   at least one non-transitory storage device; and
   at least one processing device coupled to the at least one non-transitory storage device, wherein the at least one processing device is configured to:
   electronically retrieve a user interaction portfolio of a user, wherein the user interaction portfolio comprises one or more user interactions associated with a completion of a first task;
   determine one or more interaction requirements associated with the first task;
   determine that at least one of the one or more user interactions do not meet the one or more interaction requirements associated with the first task;
   determine an interaction score associated with the user based on at least determining that at least one of the one or more user interactions do not meet the one or more interaction requirements associated with the first task;
   determine a target interaction score associated with the first task based on at least the one or more interaction requirements;
   determine that the interaction score associated with the user is greater than the target interaction score associated with the first task;
   generate one or more second image frames based on at least the one of the one or more user interactions that did not meet the one or more interaction requirements and that the interactions score is greater than the target interaction score;
   generate at least one modified video file based on at least the one or more second image frames; and
   store the at least one modified video file in a knowledge repository.

2. The system of claim 1, wherein the at least one processing device is further configured to determine the user interaction portfolio of the user, wherein determining further comprises:
   initiate an activity monitoring engine on a computing device of the user;
   continuously monitor, using the activity monitoring engine, the one or more user interactions with one or more applications used by the user to complete the first task; and
   generate the user interaction portfolio based on at least the one or more user interactions with the one or more applications used by the user to complete the first task.

3. The system of claim 2, wherein the one or more user interactions comprises at least one or more one-screen actions executed by the user using the one or more applications to complete the first task, wherein the one or more on-screen actions comprises at least windows opened, system commands executed, checkboxes clicked, and/or text entered/edited.

4. The system of claim 3, wherein the at least one processing device is further configured to:
   determine the one or more interaction requirements associated with the first task, wherein the one or more interaction requirements comprises one or more predetermined actions to be executed by the user using the one or more applications to complete the first task.

5. The system of claim 1, wherein the at least one processing device is further configured to:
   retrieve, from the knowledge repository, one or more video files demonstrating one or more interaction requirements associated with one or more tasks, wherein each of the one or more video files comprises one or more image frames;
initiate a feature extraction algorithm on the one or more image frames associated with each of the one or more video files; and
extract, using the feature extraction algorithm, one or more features associated with the one or more image frames for each of the one or more video files.

6. The system of claim 5, wherein the at least one processing device is further configured to:
initiate a vectorization engine on the one or more features associated with the one or more image frames for each of the one or more video files; and
map, using the vectorization engine, the one or more features into one or more sets of vectors of real numbers in a vector-space.

7. The system of claim 6, wherein the at least one processing device is further configured to:
initiate the feature extraction algorithm on the one or more second image frames; and
extract, using the feature extraction algorithm, one or more second features associated with the one or more second image frames.

8. The system of claim 7, wherein the at least one processing device is further configured to:
initiate the vectorization engine on the one second image frames; and
map, using the vectorization engine, one or more second features into a second set of vectors of real numbers in the vector-space.

9. The system of claim 8, wherein the at least one processing device is further configured to:
determine a similarity index between the second set of vectors associated with the one or more second image frames and each of the one or more sets of vectors associated with the one or more image frames;
determine at least one set of vectors from the one or more sets of vectors having a similarity index that is greater than a predetermined similarity index; and
determine that the at least one set of vectors is associated with at least one video file.

10. The system of claim 9, wherein the at least one processing device is further configured to:
retrieve one or more image frames associated with the at least one video file; and
interleave the one or more second image frames with the one or more image frames associated with the at least one video file; and
generate at least one modified video file based on at least interleaving the one or more second image frames with one or more image frames associated with the at least video file.

11. The system of claim 7, wherein the at least one processing device is further configured to:
electronically receive, from the knowledge repository, a first video file demonstrating the one or more interaction requirements associated with the first task;
initiate a reinforcement learning algorithm on the first video file, wherein the first video file comprises one or more first image frames;
determine, using the reinforcement learning algorithm, a first portion of the one or more first image frames from the one or more first image frames associated with the first video file, wherein the first portion of the one or more first image frames is determined based on at least the one of the one or more user interactions that did not meet the one or more interaction requirements associated with the first task; and
generate the modified first video file based on at least the first portion of the one or more first image frames from the one or more first image frames associated with the first video file.

12. The system of claim 1, wherein the at least one processing device is further configured to:
determine that the interaction score associated with the user is less than the target interaction score; and
electronically receive, from a knowledge repository, a first video file demonstrating the one or more interaction requirements.

13. A computer program product for implementing content retrofitting using information vectorization, the computer program product comprising a non-transitory computer-readable medium comprising code causing a first apparatus to:
electronically retrieve a user interaction portfolio of a user, wherein the user interaction portfolio comprises one or more user interactions associated with a completion of a first task;
determine one or more interaction requirements associated with the first task;
determine that at least one of the one or more user interactions do not meet the one or more interaction requirements associated with the first task;
determine an interaction score associated with the user based on at least determining that at least one of the one or more user interactions do not meet the one or more interaction requirements associated with the first task;
determine a target interaction score associated with the first task based on at least the one or more interaction requirements;
determine that the interaction score associated with the user is greater than the target interaction score associated with the first task;
generate one or more second image frames based on at least the one of the one or more user interactions that did not meet the one or more interaction requirements and that the interactions score is greater than the target interaction score;
generate at least one modified video file based on at least the one or more second image frames; and
store the at least one modified video file in a knowledge repository.

14. The system of claim 13, wherein the at least one processing device is further configured to determine the user interaction portfolio of the user, wherein determining further comprises:
initiate an activity monitoring engine on a computing device of the user;
continuously monitor, using the activity monitoring engine, the one or more user interactions with one or more applications used by the user to complete the first task; and
generate the user interaction portfolio based on at least the one or more user interactions with the one or more applications used by the user to complete the first task.

15. The system of claim 14, wherein the one or more user interactions comprises at least one or more one-screen actions executed by the user using the one or more applications to complete the first task, wherein the one or more on-screen actions comprises at least windows opened, system commands executed, checkboxes clicked, and/or text entered/edited.

16. The system of claim 15, wherein the at least one processing device is further configured to:
- determine the one or more interaction requirements associated with the first task, wherein the one or more interaction requirements comprises one or more predetermined actions to be executed by the user using the one or more applications to complete the first task.

17. The system of claim 13, wherein the at least one processing device is further configured to:
- retrieve, from the knowledge repository, one or more video files demonstrating one or more interaction requirements associated with one or more tasks, wherein each of the one or more video files comprises one or more image frames;
- initiate a feature extraction algorithm on the one or more image frames associated with each of the one or more video files; and
- extract, using the feature extraction algorithm, one or more features associated with the one or more image frames for each of the one or more video files.

18. The system of claim 17, wherein the at least one processing device is further configured to:
- initiate a vectorization engine on the one or more features associated with the one or more image frames for each of the one or more video files; and
- map, using the vectorization engine, the one or more features into one or more sets of vectors of real numbers in a vector-space.

19. The system of claim 18, wherein the at least one processing device is further configured to:
- initiate the feature extraction algorithm on the one or more second image frames; and
- extract, using the feature extraction algorithm, one or more second features associated with the one or more second image frames.

20. A method for implementing content retrofitting using information vectorization, the method comprising:
- electronically retrieving a user interaction portfolio of a user, wherein the user interaction portfolio comprises one or more user interactions associated with a completion of a first task;
- determining one or more interaction requirements associated with the first task;
- determining that at least one of the one or more user interactions do not meet the one or more interaction requirements associated with the first task;
- determining an interaction score associated with the user based on at least determining that at least one of the one or more user interactions do not meet the one or more interaction requirements associated with the first task;
- determining a target interaction score associated with the first task based on at least the one or more interaction requirements;
- determining that the interaction score associated with the user is greater than the target interaction score associated with the first task;
- generating one or more second image frames based on at least the one of the one or more user interactions that did not meet the one or more interaction requirements and that the interactions score is greater than the target interaction score;
- generating at least one modified video file based on at least the one or more second image frames; and
- storing the at least one modified video file in a knowledge repository.

* * * * *